United States Patent
Lorell et al.

(10) Patent No.: US 7,380,950 B1
(45) Date of Patent: Jun. 3, 2008

(54) HYBRID HIGH-BANDWIDTH DEFORMABLE FAST STEERING MIRROR

(75) Inventors: Kenneth R. Lorell, Los Altos, CA (US); Stephen R. Winzer, San Jose, CA (US); Craig L. Horn, Campbell, CA (US); Natarajan Shankar, San Jose, CA (US); Robert R. Clappier, Discovery Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 524 days.

(21) Appl. No.: 11/057,199

(22) Filed: Feb. 15, 2005

(51) Int. Cl.
*G02B 5/08* (2006.01)

(52) U.S. Cl. ........................ 359/849; 359/224

(58) Field of Classification Search ............... 359/846, 359/849, 399, 224, 290, 291, 872
See application file for complete search history.

(56) References Cited

U.S. PATENT DOCUMENTS 7,125,129 B2 * 10/2006 Oshima et al. ............. 359/849

* cited by examiner

*Primary Examiner*—Euncha P Cherry
(74) *Attorney, Agent, or Firm*—McDermott Will & Emery LLP

(57) ABSTRACT

A high-bandwidth deformable fast steering mirror ("HDFSM") system, including an electromechanical fast steering mirror ("FSM") apparatus, and a deformable mirror ("DM") apparatus mounted on the electromechanical FSM apparatus. The DM apparatus further includes a DM substrate, a backplane assembly, a plurality of electrostrictive actuators in physical communication with and between the DM substrate and the backplane assembly, for deforming the DM substrate, and a plurality of strain gauges, each strain gauge mounted on one of the plurality of electrostrictive actuators, the plurality of strain gauges measuring individual positions of the plurality of electrostrictive actuators and transmitting the positions as actuator position signals. The high-bandwidth deformable FSM also includes a closed-loop control system, the control system controlling the electromechanical FSM apparatus and the DM apparatus based upon a command input and the actuator position signals.

10 Claims, 20 Drawing Sheets

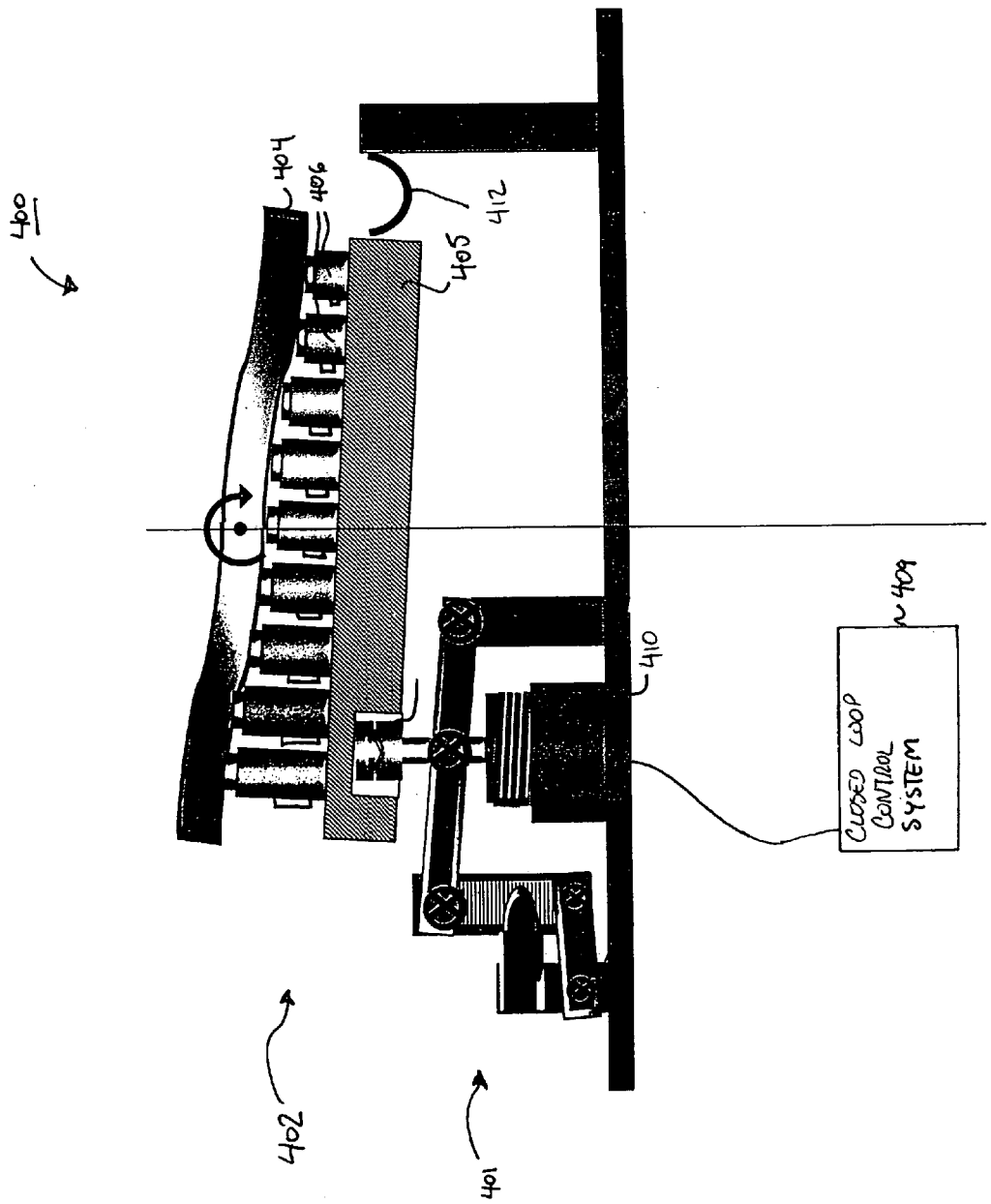

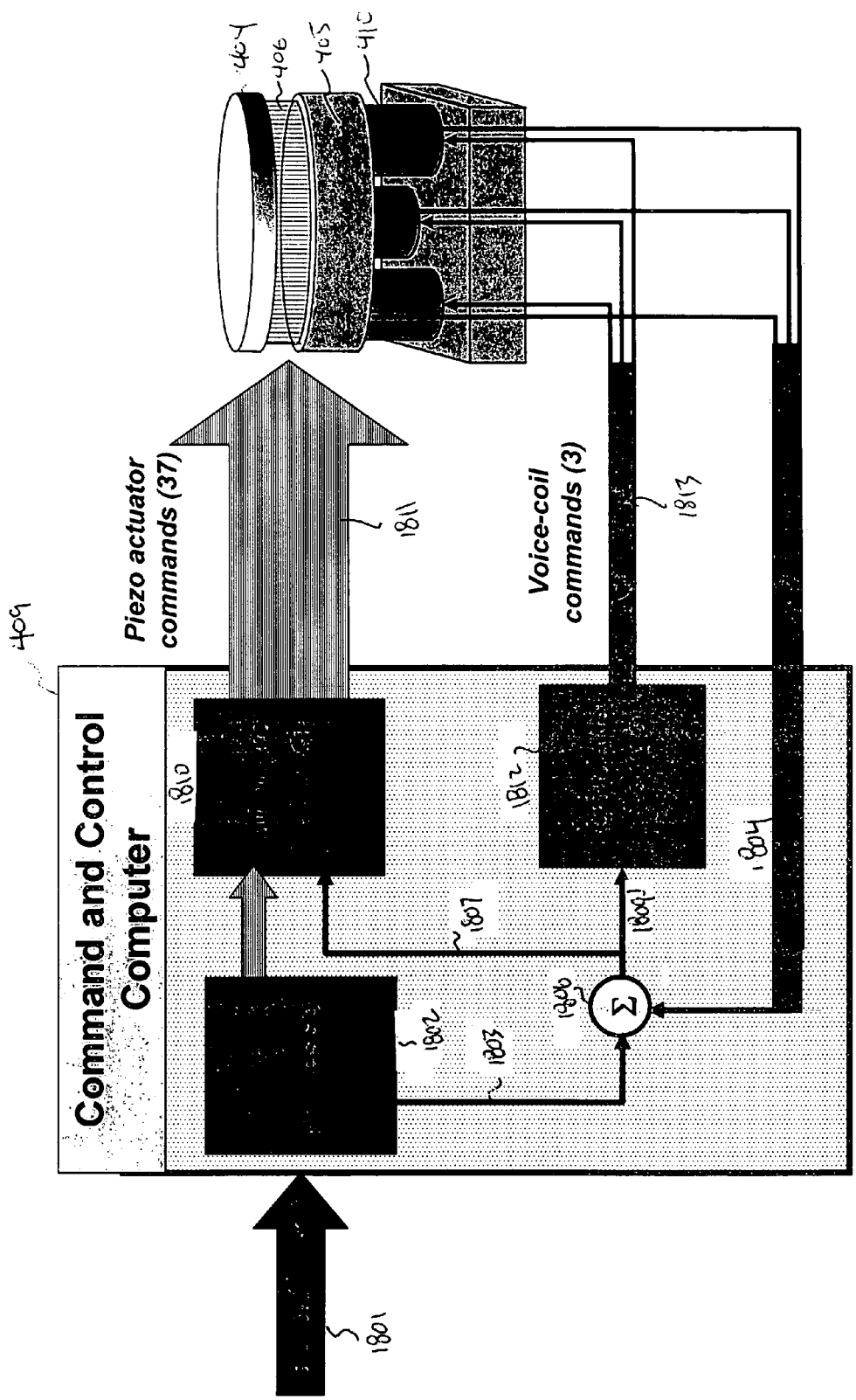

HYBRID HIGH-BANDWIDTH DEFORMABLE FAST STEERING MIRROR

STATEMENT AS TO RIGHTS TO INVENTIONS MADE UNDER FEDERALLY SPONSORED RESEARCH OR DEVELOPMENT

Not Applicable

FIELD OF THE INVENTION

The present invention generally relates to an adaptive optical system and, more particularly, relates to a hybrid fast steering mirror ("FSM")/deformable mirror ("DM") which provides high-bandwidth beam stabilization, wide-angle beam steering, and optical aberration correction.

BACKGROUND OF THE INVENTION

Modern high performance optical systems often require actively controlled optical components to provide beam pointing and line-of-sight stabilization. In high-energy laser applications, it is commonplace to use a DM to improve laser beam quality, and correct for atmospheric disturbances.

FIG. 1 illustrates a conventional DM, which is a thin, flexible mirror used to reflect light rays at measured angles, for performing high-order distortion correction. Conventional DM 100 includes deformable face sheet 101 having mirror surface 102 coated thereon. A plurality of electrostrictive actuators 104 are in physical contact with a reverse surface of deformable face sheet 101, at various locations. Conventional DM 100 also includes backplane assembly 105, upon which electrostrictive actuators 104 are affixed. Using a control system to adjust the voltage applied to individual electrostrictive actuators, conventional DM 100 displaces deformable face sheet 101 by a controlled amount, on the order of a few microns, deforming mirror surface 102 into a desired shape.

In complex modern optical systems used for observational purposes, such as the Hubble Space Telescope ("HST"), James Webb Space Telescope ("JWST") or other space-borne telescopes, conventional DMs are used to correct for residual optical imperfections caused during the manufacturing, assembly, and alignment processes. In addition to conventional DMs, however, these modern optical systems often include additional mirrors, such as steering and stabilization mirrors, which perform additional functions. As the number of electromechanical devices and reflective surfaces are increased, system weight and complexity increase, resulting in an overall decrease in mission capability.

A second problem inherent to conventional DMs is their extremely limited range of motion, owing to the practical considerations of the actuation systems that are employed to "bend" the mirror surface. In this regard, conventional DMs must be installed and aligned with great precision so that they can operate within normal limitations and specified operating parameters. Conventional DMs must therefore also be used in conjunction with other controllable mirrors to accommodate the alignment, steering and stabilization functions.

Conventional DMs are often used in directed energy systems which can take advantage of the large number of photons available in a beam path to permit sensing of the wavefront error at high bandwidth and correct it with the DM. With conventional DMs, even if plurality of electrostrictive actuators 104 are somewhat non-linear, the wavefront error sensing can be done at such a high bandwidth that the mirror can be driven to accurately correct the wavefront. Because a subsequent wavefront error measurement may not occur immediately, in low-light applications, once a wavefront error is detected and the mirror is commanded to deform in a precise manner, a conventional mirror may not be able to achieve the commanded shape through actuator response alone.

To actively control beam steering, high performance optical systems often use conventional FSMs, which effectuate line-of-sight beam stabilization, in conjunction with a separate DM. FIGS. 2 and 3 depict side and top views, respectively, of a conventional FSM, such as a LOCKHEED MARTIN® Kinematic Drive Design FSM. As illustrated, conventional FSM 200 typically includes mirror substrate 201, including mirror surface 202 coated thereon. Conventional FSM 200 also includes base plate 205, upon which mirror substrate 201 is affixed. A plurality of fast steering actuators, including fast steering actuators 206, 307, and 309, are positioned equidistantly around the periphery of base plate 205.

A plurality of two-axis flexures, including two-axis flexure 210, are in physical communication with and between each fast steering actuator and base plate 205, for steering the conventional FSM. Conventional FSM 200 further includes a plurality of U-shaped flexures, including U-shaped flexures 211, 312 and 314, positioned equidistantly from each other around the periphery of backplane assembly 205, for supporting mirror substrate 201, where each U-shaped flexure is positioned directly across backplane assembly 205 from fast steering actuators 206, 307 and 309.

One problem associated with high bandwidth FSMs used for beam stabilization is that extraordinary care and design innovation are required in order to achieve bandwidths approaching 1 kHz. Even with the most advanced engineering techniques, FSMs must be installed very accurately to approach the 1 kHz practical bandwidth limit for large (i.e. aperture size greater than 20 cm) beam stabilization (or de-jitter) mirrors.

When conventional FSMs are built with a high bandwidth capability, they have a very limited angular range. Therefore, conventional FSMs typically have to be used with a lower bandwidth, wider angle range companion mirror so that the line of sight of the optical system may be steered over an appreciable angle.

Since conventional adaptive optical systems typically use separate, heavy, large and complex mirrors for large angle motion, high bandwidth tip/tilt and phase correction, it is considered highly desirable to provide an adaptive optical system which overcomes the deficiencies of conventional FSMs and DMs. In particular, it is desirable to provide a hybrid adaptive optical system capable of both providing high-bandwidth beam stabilization and wide angle steering capabilities like an FSM, with the ability to correct optical aberrations like a DM.

SUMMARY OF THE INVENTION

The present invention generally relates to an adaptive optical system and, more particularly, relates to a hybrid FSM/DM which provides high-bandwidth beam stabilization, wide-angle beam steering, and optical aberration correction.

According to a first arrangement, the present invention is a high-bandwidth deformable fast steering mirror ("HDFSM") system, including an electromechanical FSM apparatus, and a DM apparatus mounted on the electromechanical FSM apparatus. The DM apparatus further includes a DM substrate, a backplane assembly, a plurality of electrostrictive actuators in physical communication with and between the DM substrate and the backplane assembly, for deforming the DM substrate, and a plurality of strain gauges, each strain gauge mounted on one of the plurality of electrostrictive actuators, the plurality of strain gauges measuring individual positions of the plurality of electrostrictive actuators and transmitting the positions as actuator position signals. The high-bandwidth deformable FSM also includes a closed-loop control system, the control system controlling the electromechanical FSM apparatus and the DM apparatus based upon a command input and the actuator position signals.

The HDFSM according to the present invention solves all of the problems associated with conventional DMs and FSMs, in one device. The HDFSM utilizes an extremely flat and precise high bandwidth DM mated to a wide dynamic range electromechanical system to provide moderate bandwidth control over large angles.

To its advantage, the HDFSM according to the present invention has the capability to remove the nonlinear response associated with conventional actuators through the use of closed-loop control. This feature is advantageous because it allows the HDFSM to be utilized in an optical system which has minimal capability to make high-bandwidth wavefront measurements, such as an optical system which is trying to form an image in low ambient light conditions.

The DM substrate and the backplane assembly are round. The electromechanical FSM apparatus further includes a plurality of fast steering actuators positioned circumferentially at equal distances around the backplane assembly, and a plurality of two-axis flexures in physical communication with and between the plurality of fast steering actuators and the backplane assembly.

The electromechanical FSM apparatus further includes a plurality of U-shaped flexures positioned circumferentially at equal distances around the backplane assembly, for supporting the DM apparatus. The plurality of U-shaped flexures are positioned directly across the backplane assembly from the plurality of fast steering actuators.

The plurality of fast steering actuators comprise voice coil actuators. The electromechanical FSM apparatus has a bandwidth control of up to 200 Hz over an angle of ±25 mrad, and the DM apparatus has a bandwidth of up to 10 kHz.

The electrostrictive actuators utilized by the HDFSM system according to the present invention have a very high-stroke capability. By utilizing a pair of integral strain gauges to measure the actuator extension, and close the loop through a power amplifier, the HDFSM system can achieve a large stroke, while eliminating hysteresis and nonlinearities. As such, the HDFSM system has the capability to operate in low ambient light, low bandwidth wavefront error sensing environments.

According to a second arrangement, the present invention is a reaction canceling HDFSM system, including a first electromechanical FSM apparatus, and a DM apparatus mounted on the first electromechanical-FSM apparatus. The DM apparatus further includes a DM substrate, a backplane assembly, a plurality of electrostrictive actuators in physical communication with and between the DM substrate and the backplane assembly, for deforming the DM substrate, and a plurality of strain gauges, each strain gauge mounted on one of the plurality of electrostrictive actuators, the plurality of strain gauges measuring individual positions of the plurality of electrostrictive actuators and transmitting the positions as actuator position signals. The HDFSM system further includes a second electromechanical FSM apparatus mounted obverse to the first electromechanical FSM apparatus, and a counterweight mounted on the second electromechanical FSM apparatus, the counterweight synchronously moving in an equal and opposite motion to the DM apparatus, for canceling motion of the DM apparatus. The HDFSM system also includes a closed-loop control system, the control system controlling the first electromechanical FSM apparatus, the second electromechanical FSM apparatus, and the DM apparatus based upon a command input and the actuator position signals.

The present invention also compensates for and corrects optical aberrations which are induced by inherent manufacturing and assembly errors, by atmospheric conditions, or by other phenomena. Moreover, the HDFSM system according to the present invention allows for enhanced wide-angle line-of-sight steering, optical alignment, and beam walk control, features which would conventionally require at least three actively-controlled mirrors to achieve.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIG. 5 depicts a side view of the FIG. 4 HDFSM system, at a high angle of deflection;

FIG. 18 depicts the HDFSM control architecture, according to one example embodiment of the present invention.

DETAILED DESCRIPTION OF THE INVENTION

The present invention generally relates to an improved adaptive optical system. More particularly, the present invention relates to an FSM which can provide high-bandwidth beam stabilization, wide-angle beam steering, and optical aberration correction.

Figure 1:
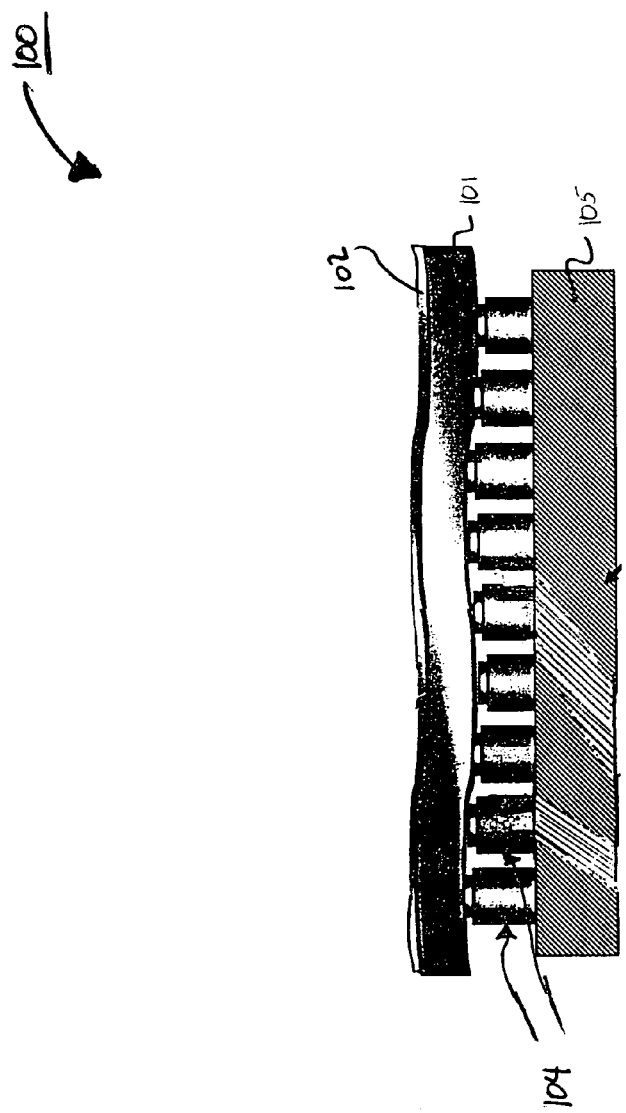
FIG. 1 depicts a side view of a conventional DM.
Figure 2:
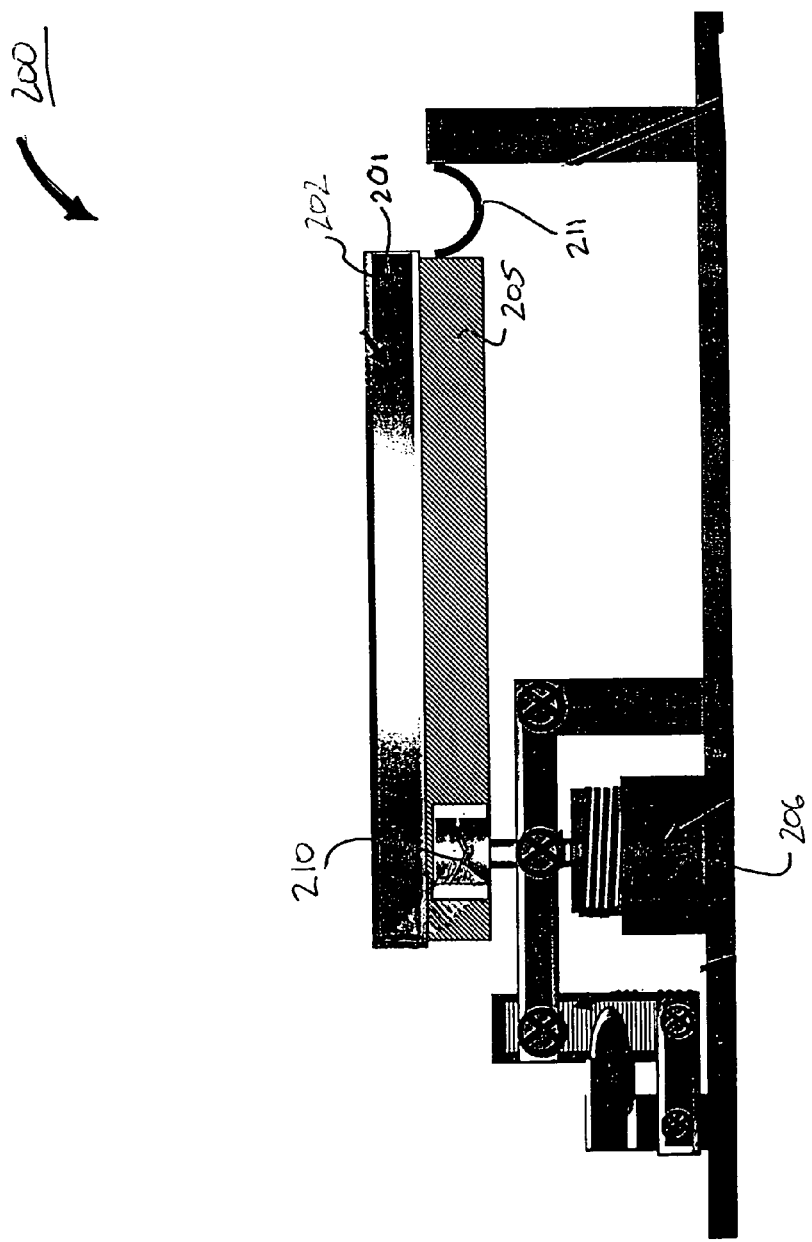
FIG. 2 depicts a side view of a conventional FSM.
Figure 3:
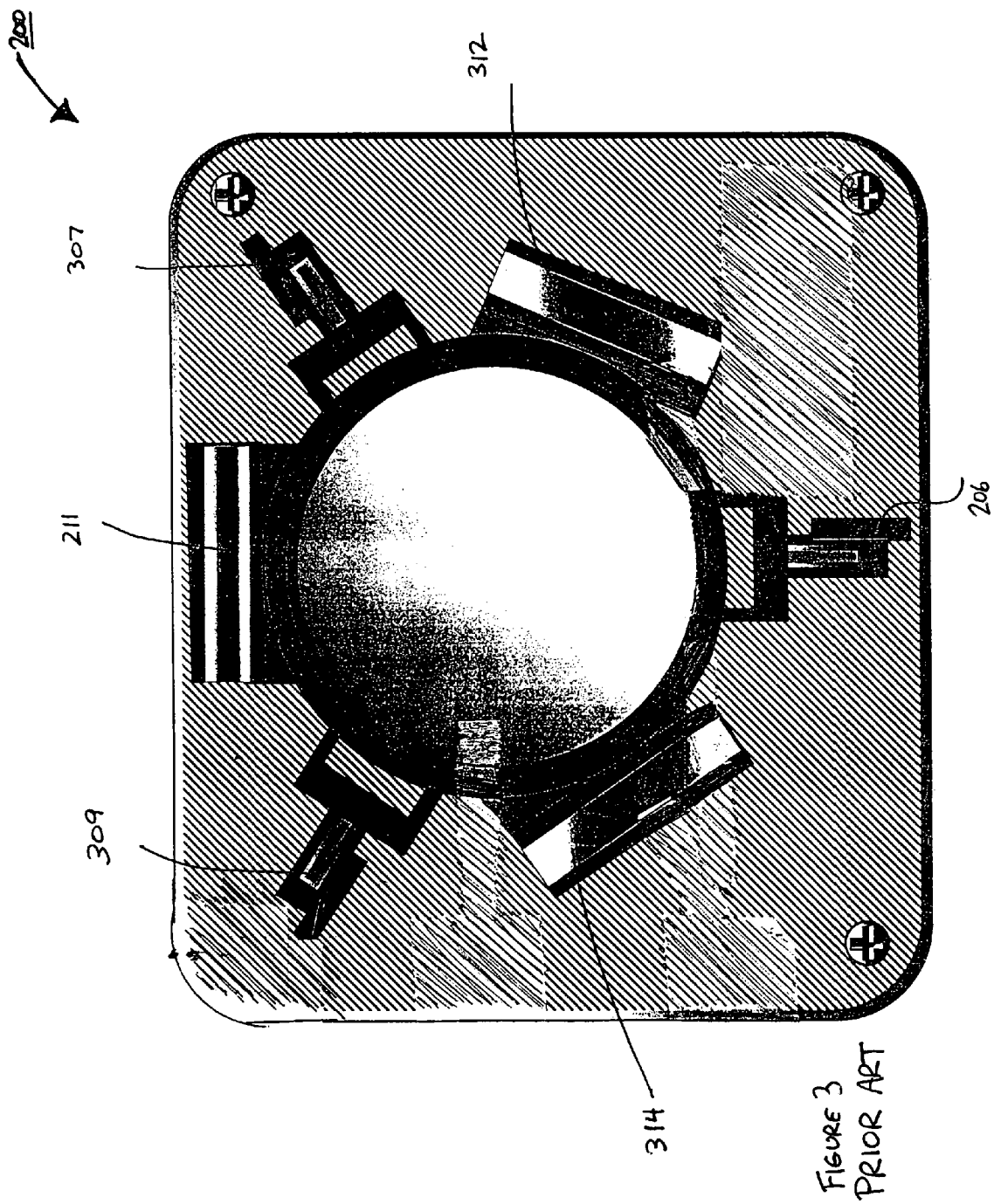
FIG. 3 depicts a top view of the FIG. 2 conventional FSM.
Figure 4A:
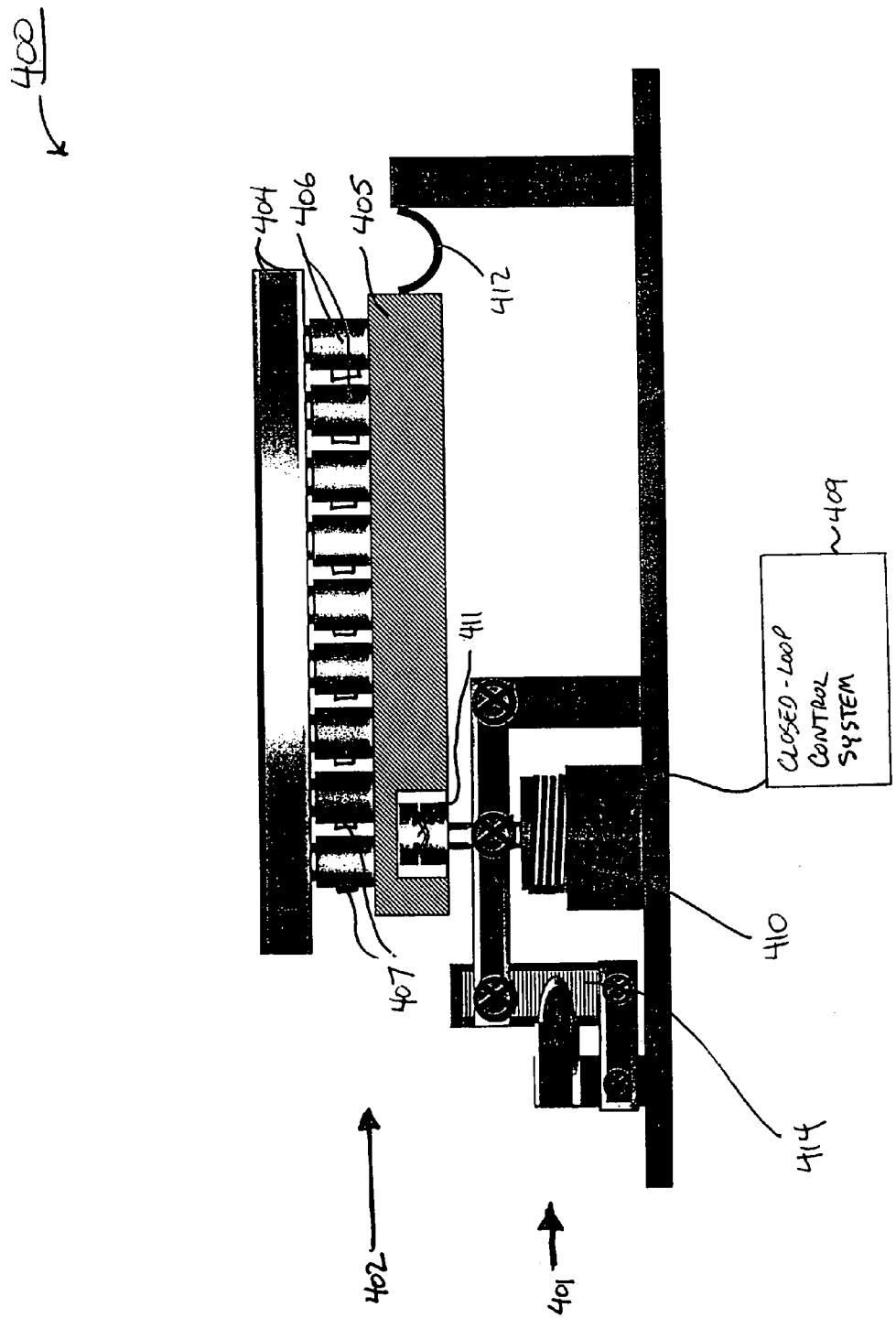
FIGS. 4A and 4B depicts a side view of a high-bandwidth deformable FSM ("HDFSM") system and the closed-loop control system, respectively, according to one embodiment of the present invention.
Figure 4B:
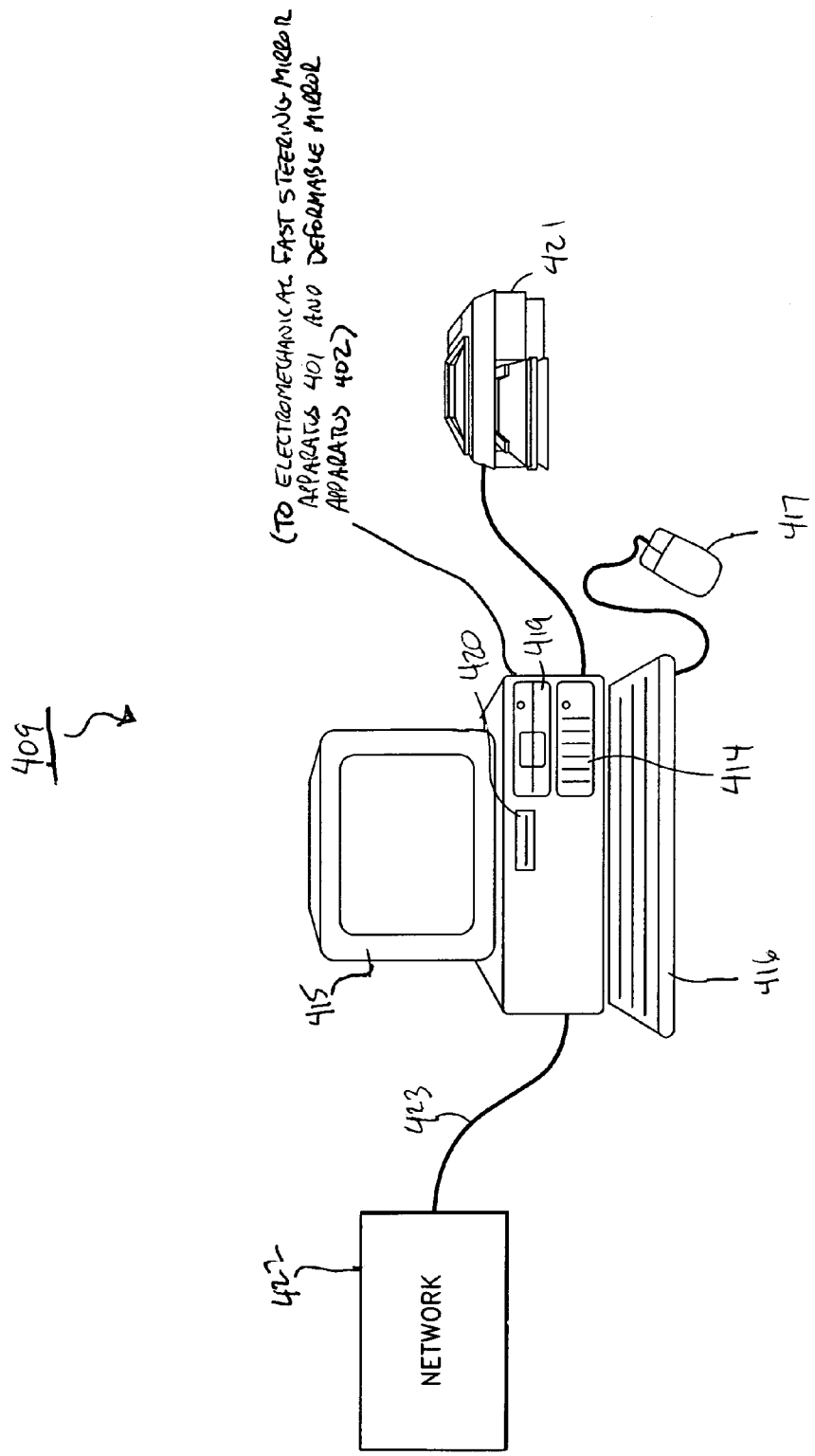

FIGS. 4A and 4B depicts a side view of a HDFSM system and the closed-loop control system, respectively, according to one embodiment of the present invention. FIG. 5 depicts a side view of the FIG. 4A HDFSM system, at a high angle of deflection. Briefly, the HDFSM system according to the present invention includes an electromechanical FSM apparatus, and a DM apparatus mounted on the electromechanical FSM apparatus. The HDFSM system further includes a closed-loop control system, the control system controlling the electromechanical FSM apparatus and the DM apparatus based upon a command input and actuator position signals.

In more detail, HDFSM system 400 includes electromechanical FSM apparatus 401, and DM apparatus 402 mounted on electromechanical FSM apparatus 401. DM apparatus 402 further includes DM substrate 404, backplane assembly 405, plurality of electrostrictive actuators 406 in physical communication with and between DM substrate 404 and backplane assembly 405, for deforming DM substrate 404, and plurality of strain gauges 407, each strain gauge of plurality of strain gauges 407 mounted on one of plurality of electrostrictive actuators 406, plurality of strain gauges 407 measuring individual positions of plurality of electrostrictive actuators 406 and transmitting the positions as actuator position signals. HDFSM system 400 also includes closed-loop control system 409, control system 409 controlling electromechanical FSM apparatus 401 and DM apparatus 402 based upon a command input and the actuator position signals.

Since conventional actuators are highly non-linear, an operator of a conventional DM typically cannot expect actual actuator positions to match the commanded input. Using closed-loop control system 409, local feedback on each of plurality of electrostrictive actuators 406 is supplied by plurality of strain gauges 407, so that the inherent non-linearities of each actuator are isolated and eliminated. A closed-loop system can be used where incoming light is low energy, where few photons can be spared for external non-linearity and hysteresis correction.

Control system 409 uses closed-loop feedback to control the linearity of its output, where the overall behavior of the HDFSM system is inherently non-linear due to the physics of each actuator. Without such a control system, the HDFSM system would not be able to quickly and accurately follow a voltage signal from control system 409.

HDFSM system 400 solves all of the problems associated with conventional DMs and FSMs, in one device. The HDFSM utilizes an extremely flat and precise high bandwidth DM mated to a wide dynamic range electromechanical system to provide moderate bandwidth control over large angles.

HDFSM system 400 has the capability to remove the non-linear response of plurality of electrostrictive actuators 406 through the use of closed-loop control. This capability is important, because it allows HDFSM system 400 to be used in an optical system with a minimum capability to make high bandwidth wavefront measurements, such as an optical system which tries to form an image in low ambient light conditions.

Conventional DMs, for example, are often used in directed energy systems which can take advantage of the large number of photons available in a beam path to permit sensing of the wavefront error at high bandwidth and correct it with the DM. With conventional DMs, even if the actuators are somewhat non-linear, the wavefront error sensing can be done at such a high bandwidth that the mirror can be driven to accurately correct the wavefront. In low-light applications, however, once a wavefront error is detected, the mirror is commanded to deform in a precise manner and, because the subsequent wavefront error measurement may not occur immediately, a conventional mirror may not be able to achieve the commanded shape through actuator response alone. Specifically, the actuators are required to achieve the precise length or position commanded by the mirror figure control system.

DM substrate 404 and backplane assembly 405 are round, although in alternate aspects DM substrate 404 and backplane assembly 405 are not round. Electromechanical FSM apparatus 401 further includes a plurality of fast steering actuators, including fast steering actuator 410, positioned circumferentially at equal distances around backplane assembly 405, and a plurality of two-axis flexures, including two-axis flexure 411, in physical communication with and between the plurality of fast steering actuators and backplane assembly 405.

Electromechanical FSM apparatus 401 further includes a plurality of U-shaped flexures, including U-shaped flexure 412, positioned circumferentially at equal distances around backplane assembly 405, for supporting DM apparatus 402. The U-shaped flexures are positioned directly across backplane assembly 405 from the plurality of fast steering actuators.

The plurality of fast steering actuators comprise voice coil actuators, although in further aspects of the present invention, the plurality of fast steering actuators are other types of actuators. Electromechanical FSM apparatus 401 has a bandwidth control of up to 200 Hz over an angle of ±25 mrad, and DM apparatus 402 has a bandwidth of up to 10 kHz. In further arrangements of the present invention, the bandwidth control of electromechanical FSM apparatus 401, and bandwidth of DM 402 may be tailored to meet the requirements of the adaptive optical system in which HDFSM system 400 is operating. Additionally, electromechanical FSM apparatus 401 further includes linkage and interferometric position sensor 414, for measuring the position of the fast steering actuators.

The problems of high bandwidth beam stabilization, wide angle beam steering, and correction of optical aberrations are conventionally solved using three distinctly different active mirror designs. The HDFSM system depicted in FIGS. 4A, 4B and 5, however, solves all of the aforementioned deficiencies, using a single device.

Plurality of electrostrictive actuators 406 employed by HDFSM system 400 have the advantage of a high stroke capability. In one example arrangement, a stroke of approximately 15 to 20 microns is achieved for a 1 centimeter length actuator. Although typical long stroke actuators exhibit a tremendous non-linearity and hysteresis, HDFSM 400 utilizes integral strain gauges to measure the actuator extension and close the loop through a power amplifier. As such, HDFSM system 400 achieves a large stroke, while substantially eliminating hysteresis and non-linearity, providing the capability for HDFSM system 400 to operate in the low ambient light, low bandwidth wavefront error sensing environment.

HDFSM system 400 utilizes an extremely flat and precise high bandwidth (up to 10 kHz) DM mated to a wide dynamic range electromechanical system that provides moderate bandwidth (200 Hz) control over large angles (±25 mrad). DM apparatus 402 comprises a fine adjustment stage with 37 electrostrictive ceramic actuators, providing ±25 grad tilt at 1 kHz. In further aspects, fewer or more actuators, or actuators of other types can be used. Electromechanical FSM apparatus 401 comprises three voice coil actuators steering a mirror backplane, the voice coil actuators providing ±25 Grad tilt at 100 to 200 Hz, for providing tilt offload to the fine adjustment stage.

By combining these two technologies and linking them with closed-loop control system 409, HDFSM system 400 is capable of i) high bandwidth beam stabilization of up to 10 kHz in some applications (where required), ii) compensation for and correction of optical aberrations which are either induced by inherent manufacturing and assembly errors, or by atmospheric or other phenomena, and iii) wide angle line of sight steering, optical alignment, and beam walk control. As such, the HDFSM system according to the present invention overcomes the deficiencies of known adaptive optical systems, which would typically require at least three actively controlled mirrors to achieve this combination of functions.

This solution is revolutionary because it has the possibility of saving weight, power, complexity, and cost, while minimizing the number of required mechanisms, enhancing overall system reliability, and reducing the number of reflective surfaces in the optical train. In addition, the performance of the high bandwidth beam stabilization, independent of aberration correction or wide angle steering, is substantially better with this approach.

Due to inherent characteristics of electrostrictive actuators, DM apparatus 402 will react more quickly than FSM apparatus 401 to a given command input, typically within a few microseconds, resulting in a high angle of deflection on the mirror surface. As FSM apparatus 401 catches up, however, to a large angle change, closed-loop control system 409 will adjust plurality of electrostrictive actuators 406 to a more neutral position.

Closed-loop control system 409 includes computer-readable storage medium, such as fixed disk drive 414, for storing applications which control electromechanical FSM apparatus 401 and DM apparatus 402. As shown in FIG. 4B, the hardware environment may include display monitor 415 for displaying text and images to a user, keyboard 416 for entering text data and user commands into all-digital control system 409, mouse 417 for pointing, selecting and manipulating objects displayed on display monitor 415, fixed disk drive 414, removable disk drive 419, tape drive 420, hardcopy output device 421, computer network 422, and computer network connection 423.

Operating system programs, applications, and various data files, such as image data files or image compression application programs, are stored on disks. The files are stored on fixed disk drive 414 or on removable media for removable disk drive 419 without departing from the scope of the present invention.

Figure 6:
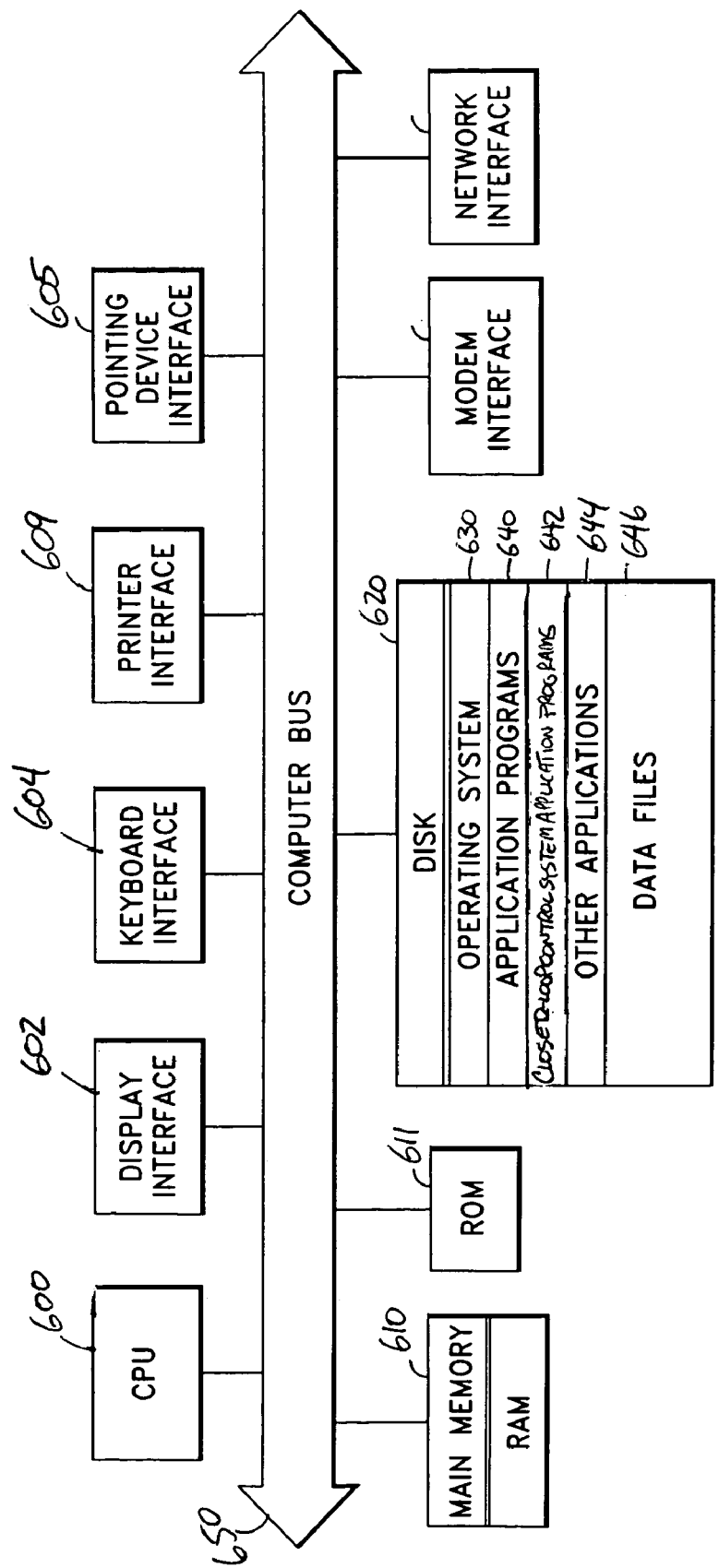
FIG. 6 depicts an example of an internal architecture of an all-digital control system.

FIG. 6 is a detailed block diagram showing the internal architecture of closed-loop control system 409. As shown in FIG. 6, the computing environment includes central processing unit ("CPU") 600 where the computer instructions that comprise an operating system or an application, including the closed-loop control system application programs 642, are processed; display interface 602 which provides communication interface and processing functions for rendering graphics, images, and text on display monitor 415; keyboard interface 604 which provides a communication interface to keyboard 416; pointing device interface 605 which provides a communication interface to mouse 417 or an equivalent pointing device; printer interface 609 which provides a communication interface to hardcopy output device 421; random access memory ("RAM") 610 where computer instructions and data can be stored in a volatile memory device for processing by CPU 600; read-only memory ("ROM") 611 where invariant low-level systems code or data for basic system functions such as basic input and output (I/O), startup, or reception of keystrokes from keyboard 414 are stored in a non-volatile memory device; disk 620 which can comprise fixed disk drive 414 and removable disk drive 419, where the files that comprise operating system 630, application programs 640 (including closed-loop control system application programs 642 and other applications 644) and data files 646 are stored; modem interface 614 which provides a communication interface to computer network 422 over a modem connection; and computer network interface 616 which provides a communication interface to computer network 422 over computer network connection 423. The constituent devices and CPU 600 communicate with each other over computer bus 650.

The closed-loop control of electromechanical FSM apparatus 401 and DM apparatus 402 is preferably implemented as shown, however it is also possible to implement the closed-loop control system according to the present invention as a dynamic link library ("DLL"), or as a plug-in to other application programs.

Although FIGS. 4 to 6 illustrate a preferred embodiment of a closed-loop control system that executes program code, or program or process steps, other types of all-digital control systems may also be used as well. In particular, although closed-loop control system 409 has been described as a desktop PC, in further arrangements of the present invention closed-loop control system 409 is a laptop, a workstation, a midrange computer, a mainframe, or an embedded system.

Figure 7:
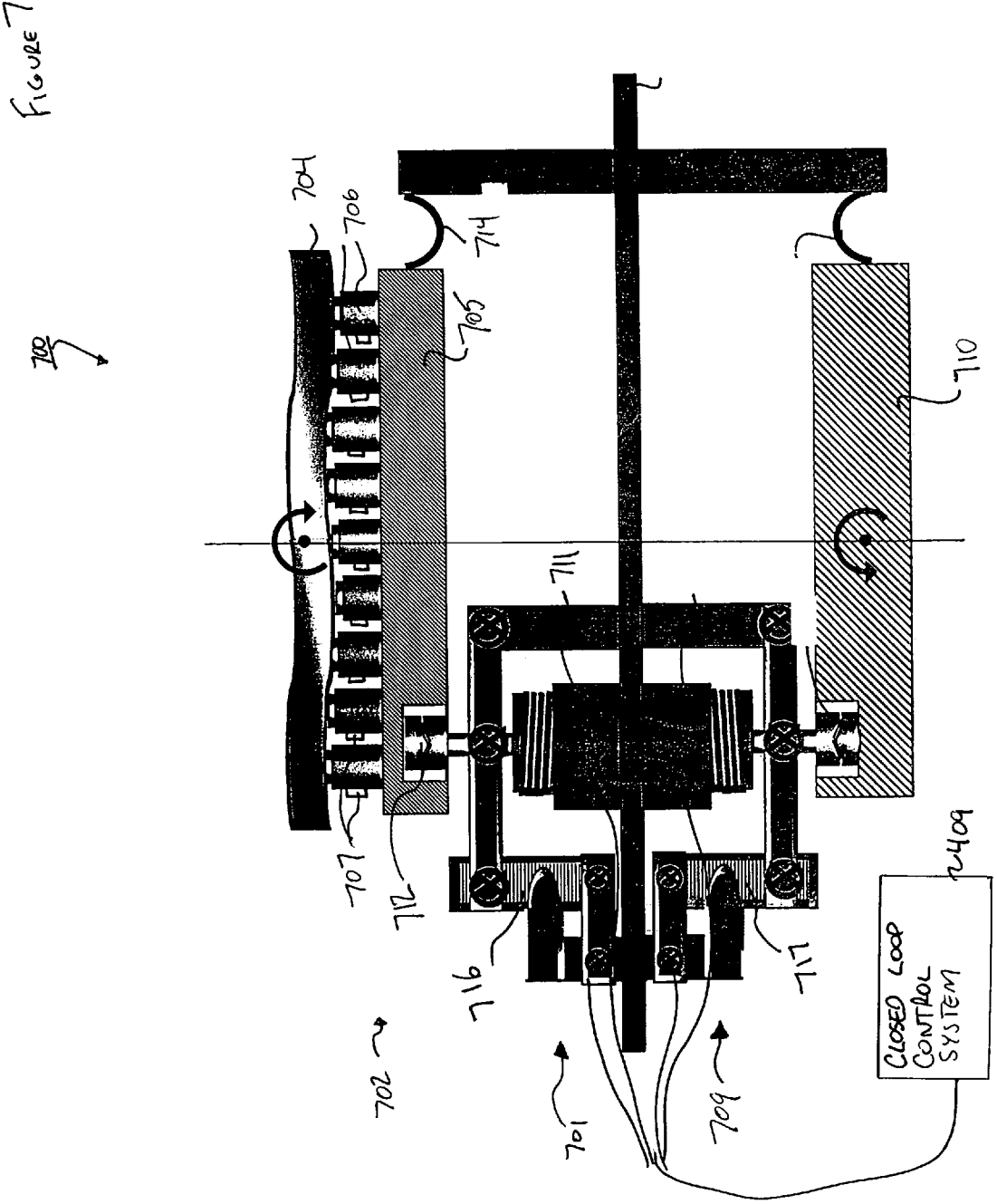
FIG. 7 depicts a side view of a reaction canceling HDFSM system according to a second embodiment of the present invention.

FIG. 7 depicts a side view of a reaction canceling HDFSM system according to a second embodiment of the present invention. Briefly, the reaction canceling HDFSM system includes a first electromechanical FSM apparatus, and a DM apparatus mounted on the first electromechanical FSM apparatus. The reaction canceling HDFSM system also includes a second electromechanical FSM apparatus mounted obverse to the first electromechanical FSM apparatus, a counterweight mounted on the second electromechanical FSM apparatus, and a closed-loop control system.

In more detail, reaction canceling HDFSM system 700 includes first electromechanical FSM apparatus 701 and DM apparatus 702 mounted the first electromechanical FSM apparatus 701. DM apparatus 702 further includes DM substrate 704, backplane assembly 705, a plurality of electrostrictive actuators 706 in physical communication with and between DM substrate 704 and backplane assembly 705, for deforming DM substrate 704, and plurality of strain gauges 707, each strain gauge mounted on one of plurality of electrostrictive actuators 706, plurality of strain gauges 707 measuring individual positions of plurality of electrostrictive actuators 706 and transmitting the positions as actuator position signals. HDFSM system 700 further includes second electromechanical FSM apparatus 709 mounted obverse to first electromechanical FSM apparatus 701, and counterweight 710 mounted on second electromechanical FSM apparatus 709, counterweight 710 synchronously moving in an equal and opposite motion to DM apparatus 702, for canceling motion of DM apparatus 702. HDFSM system 700 also includes closed-loop control system 409, control system 409 controlling first electromechanical FSM apparatus 701, second electromechanical FSM apparatus 709, and DM apparatus 702 based upon a command input and the actuator position signals.

DM substrate 704 and backplane assembly 705 are round, although in alternate aspects DM substrate 704 and backplane assembly 705 are not round. First electromechanical FSM apparatus 701 further includes a plurality of fast steering actuators, including fast steering actuator 711, positioned circumferentially at equal distances around backplane assembly 705, and a plurality of two-axis flexures, including two-axis flexure 712, in physical communication with and between the plurality of fast steering actuators and backplane assembly 705.

First electromechanical FSM apparatus 701 further includes a plurality of U-shaped flexures, including U-shaped flexure 714, positioned circumferentially at equal distances around backplane assembly 705, for supporting DM apparatus 702. The U-shaped flexures are positioned directly across backplane assembly 705 from the plurality of fast steering actuators.

The plurality of fast steering actuators comprise voice coil actuators, although in further aspects of the present invention, the plurality of fast steering actuators are other types of actuators. First electromechanical FSM apparatus 701 has a bandwidth control of up to 200 Hz over an angle of ±25 mrad, and DM apparatus 702 has a bandwidth of up to 10 kHz. In further arrangements of the present invention, the bandwidth control of first electromechanical FSM apparatus 701, and bandwidth of DM 702 may be tailored to meet the requirements of the adaptive optical system in which HDFSM system 700 is operating. Additionally, first electromechanical FSM apparatus 701 further includes linkage and interferometric position sensor 716, and second electromechanical FSM apparatus 709 includes linkage and interferometric position sensor 717, for measuring the position of the fast steering actuators.

Figure 8:
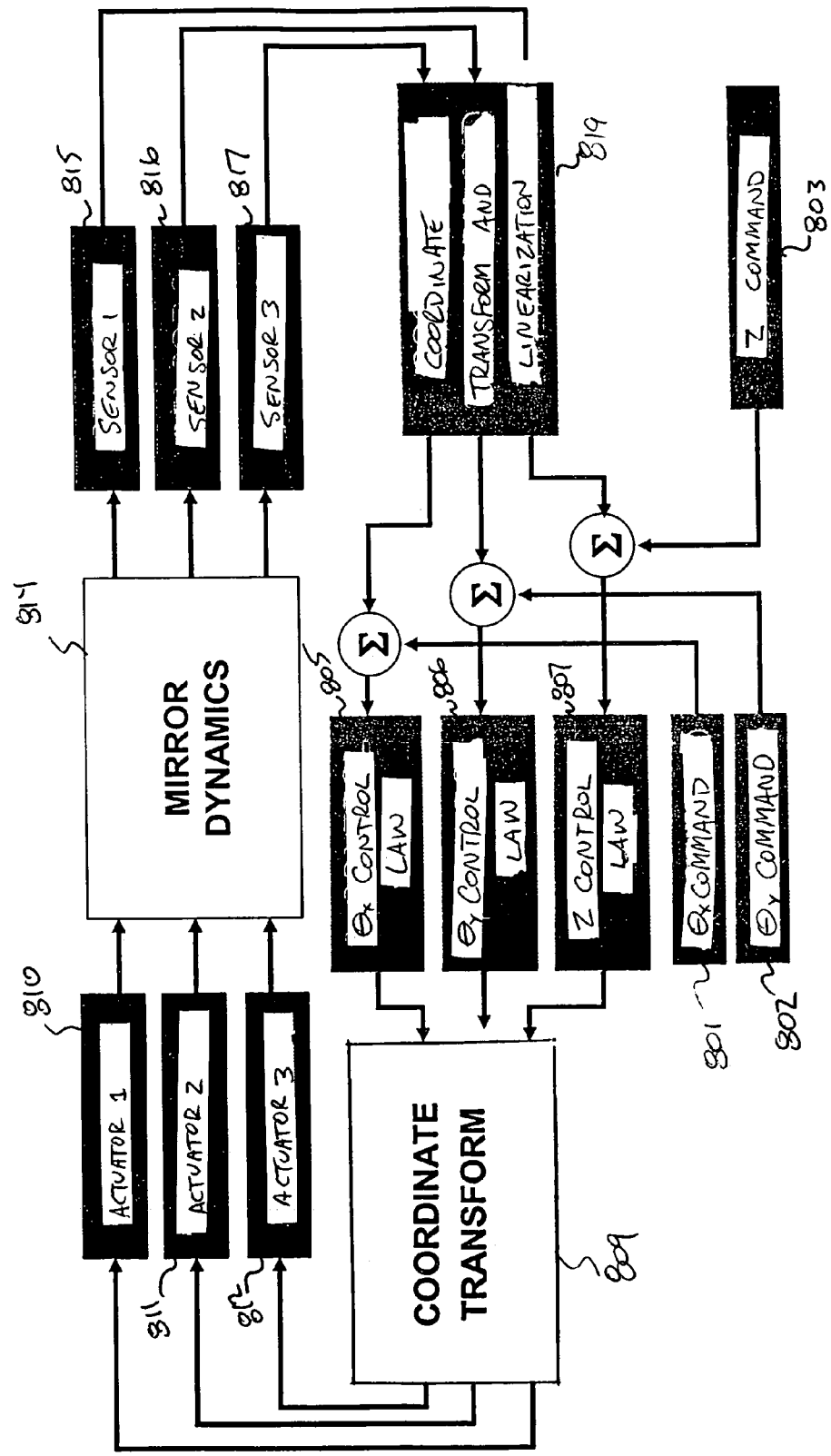
FIG. 8 is a control system diagram for the HDFSM system.

FIG. 8 is a control diagram for closed-loop control system 409. A command input $X_C$, comprising $\theta_x$ command component 801, $\theta_y$ command component 802, and z command component 803, is input into control system 409 by the operator of the HDFSM system. $\theta_x$ control law 805, $\theta_y$ control law 806, and z control law 807 are applied to the associated command components to determine desired actuator positioning, and the coordinate transform 809 determines the corresponding voltages needed to be transmitted to each actuator, to correctly position each actuator. These voltages are applied to plurality of electrostrictive actuators 406 and plurality of fast steering actuators 410, which comprise actuators 810 to 812 in FIG. 8, and the HDFSM is mechanically positioned (at reference 814).

Figure 9:
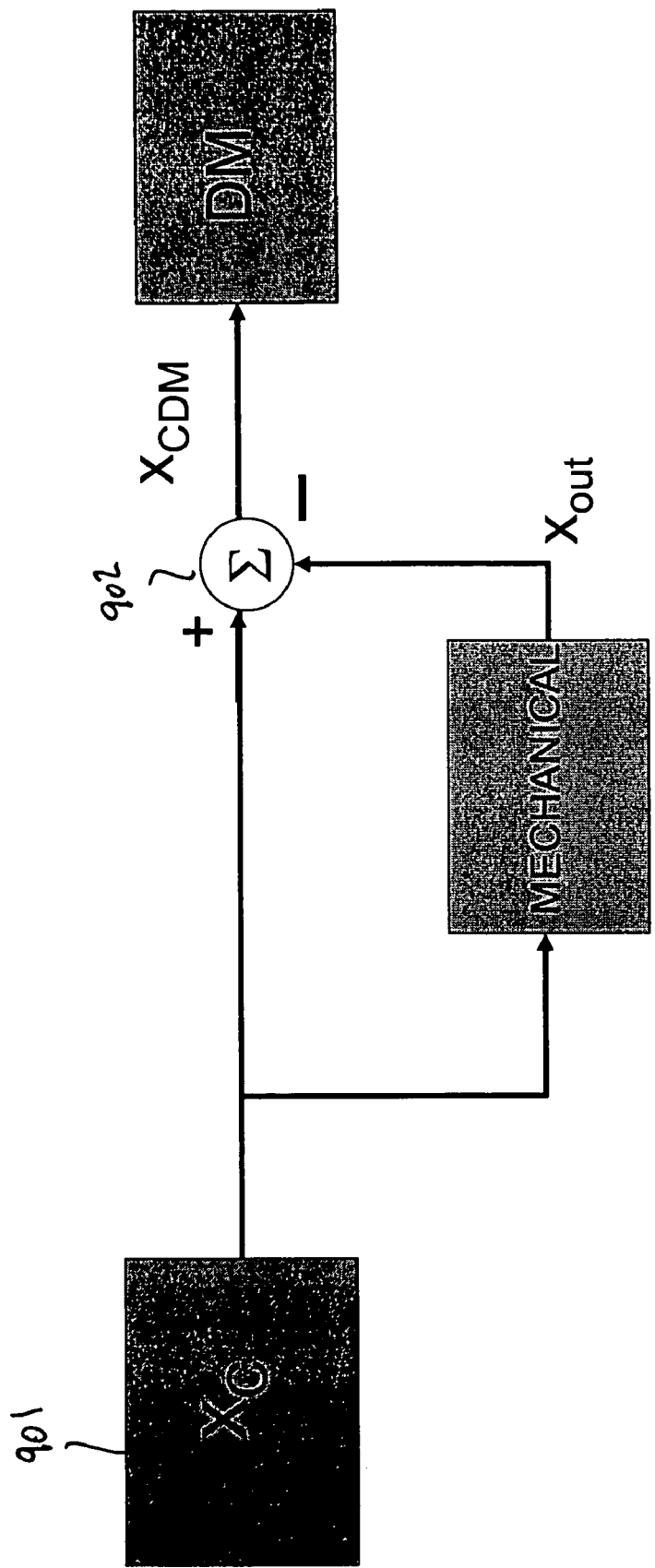
FIG. 9 is a control system diagram illustrating the closed-loop feedback of strain gauge measurements to a control input, in order to achieve desired DM positioning.

Plurality of strain gauges 407, including sensors 815 to 817, and linkage and interferometric position sensors mounted on the fast steering actuators measure the actual position of corresponding actuators 810 to 812, and transmit these measured positions as actuator position signals to the closed-loop control system. A coordinate transform and linearization is performed (at reference 819), to compare the commanded actuator positions to the actual actuator positions. As shown in FIG. 9, the difference $X_{out}$ between each commanded actuator position $X_C$ (reference 901) and the actual actuator position X is added to each of $\theta_x$ command component 801, $\theta_y$ command component 802, or z command component 803 (at reference 902), and the resulting values are input into control system 409, as described above, as $X_{CDM}$.

Figure 10:
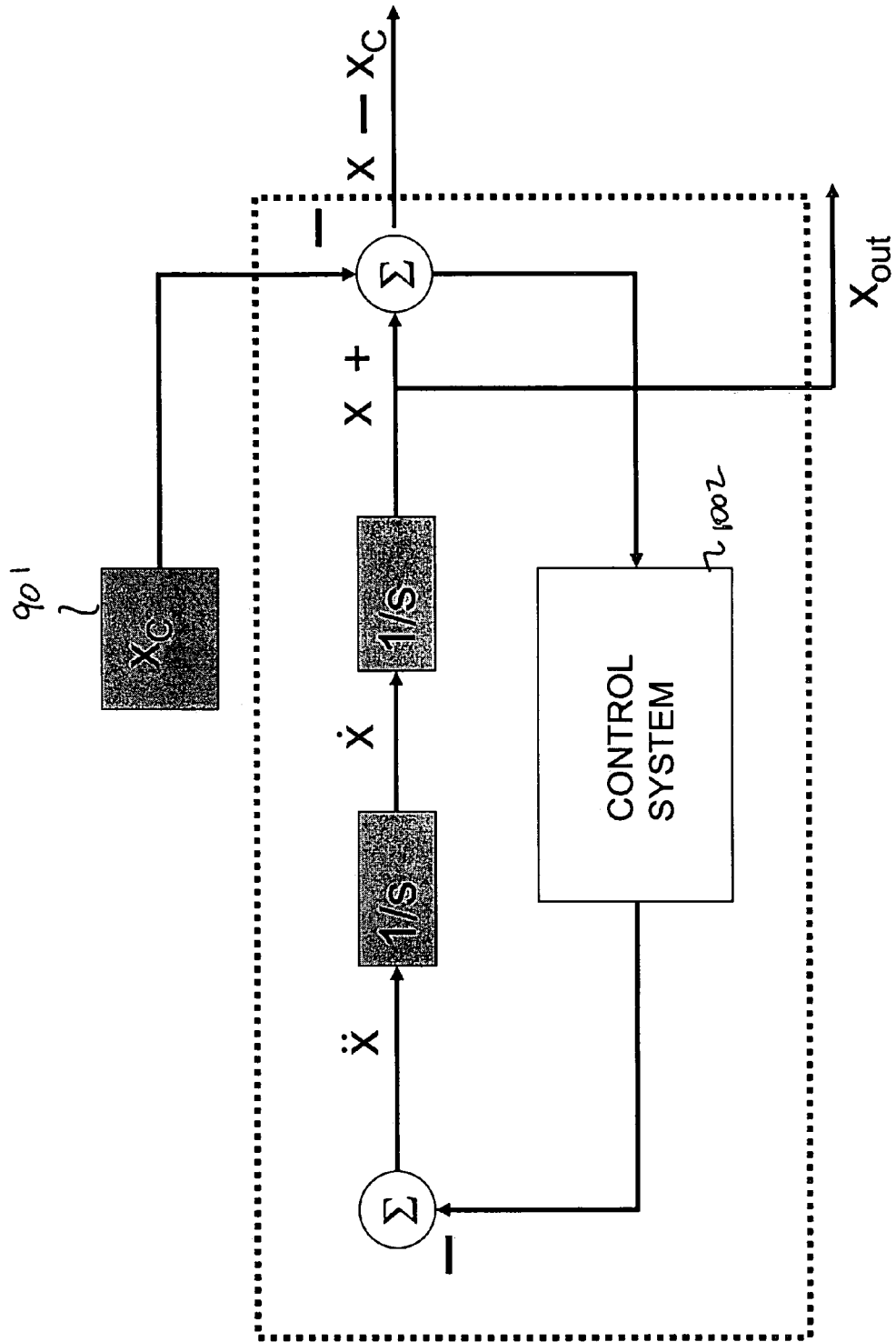
FIG. 10 illustrates isolation and mitigation of DM actuator non-linearities, via closed-loop control.

In this manner, a closed-loop control system is formed, and measured actuator positions are compared with the command input in a continuous fashion, in order to compensate for actuator non-linearities. As is shown in FIG. 10, on each iteration of the closed control loop, control system 1002 zeroes out $X-X_c$, which represents the difference between commanded actuator positions and actual actuator positions, taking into effect the mass and inertia $$\left(\frac{1}{s^2}\right)$$

of DM apparatus 402.

The electrostrictive actuators employed by HDFSM system 400 have a very high stroke capability, achieving a stroke of approximately 15 to 20 micron for a 1 centimeter actuator. By utilizing an integral strain gauge to measure the actuator extension, and by closing the loop through the power amplifier, HDFSM system 400 can achieve a large stroke and can eliminate hysteresis and non-linearity. As such, HDFSM system 400 can operate in low ambient light, low bandwidth wavefront error sensing environments.

Accordingly, HDFSM system 400 has the capability to remove an actuator's non-linear response through the use of a closed-loop control system. As such, HDFSM system 400 can be used in optical systems with minimal capability to make high-bandwidth wavefront measurements, such as optical systems which attempt to form images in low ambient light conditions.

Figure 11:
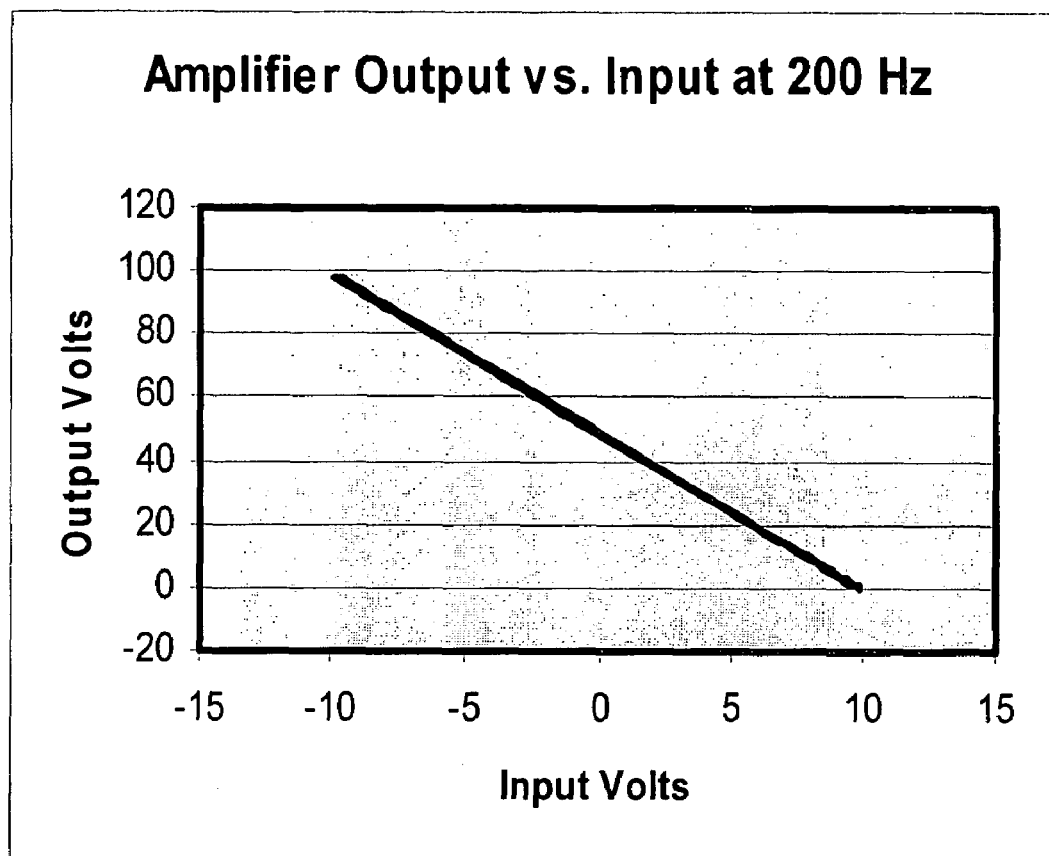
FIG. 11 is a chart illustrating output voltage versus input voltage for the HDFSM according to the present invention, derived from experiments at 200 Hz.

In experiments, the HDFSM according to the present invention works well, and exhibits favorable operational results. Specifically, the HDFSM is able to drive outputs all the way to power supply voltages, and has a greater bandwidth. Moreover, the HDFSM has less phase shift, especially at higher frequencies. FIG. 11 is a chart illustrating output voltage versus input voltage for the HDFSM, derived from experiments at 200 Hz. As is plainly seen, the voltage line is nearly a straight.

Figure 12A:
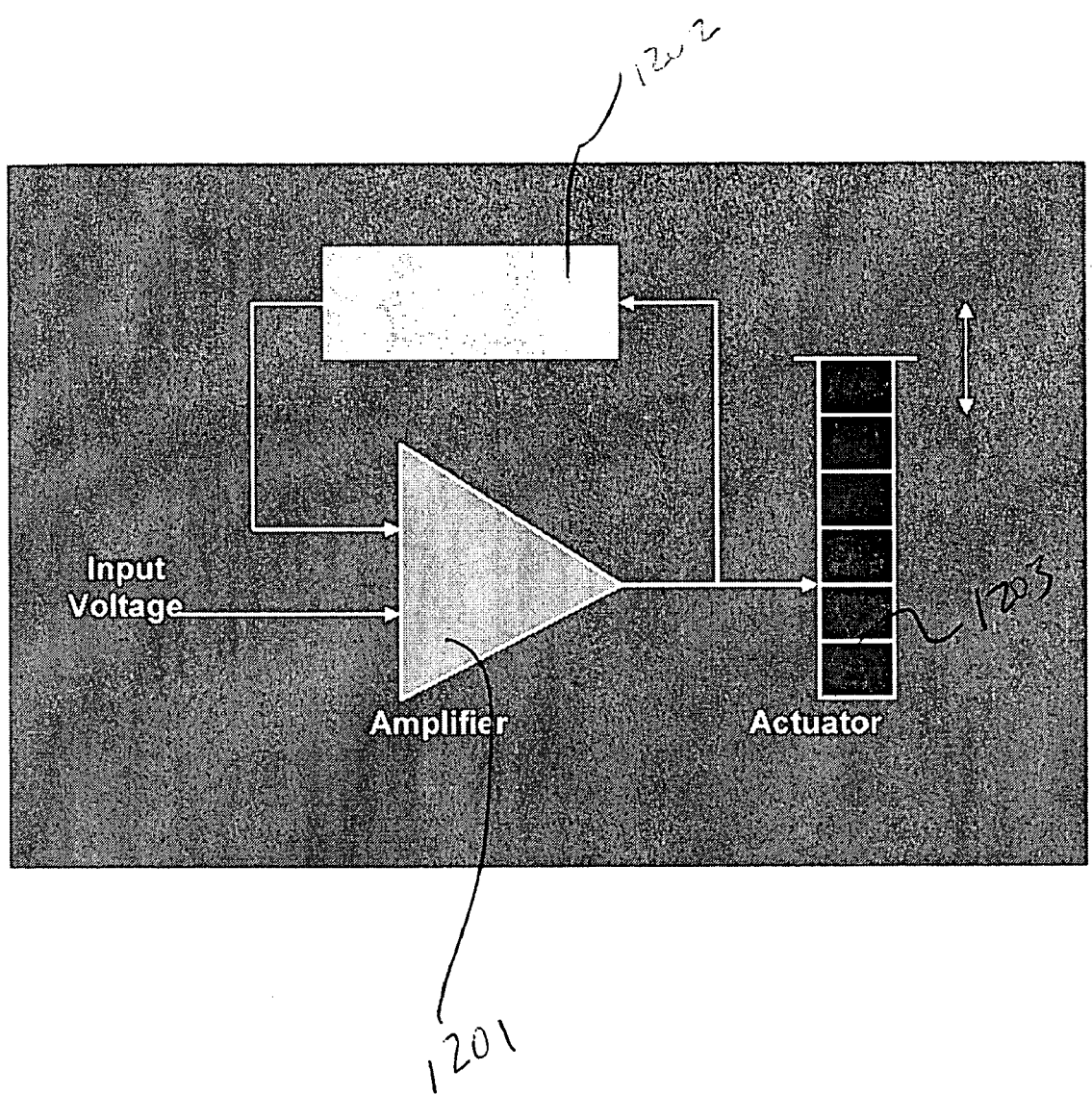
FIGS. 12A and 12B are a block diagram depicting a conventional, open-loop feedback control system for an actuator, and a chart depicting actuator motion versus input voltage chart, for the FIG. 12A system, respectively.
Figure 12B:
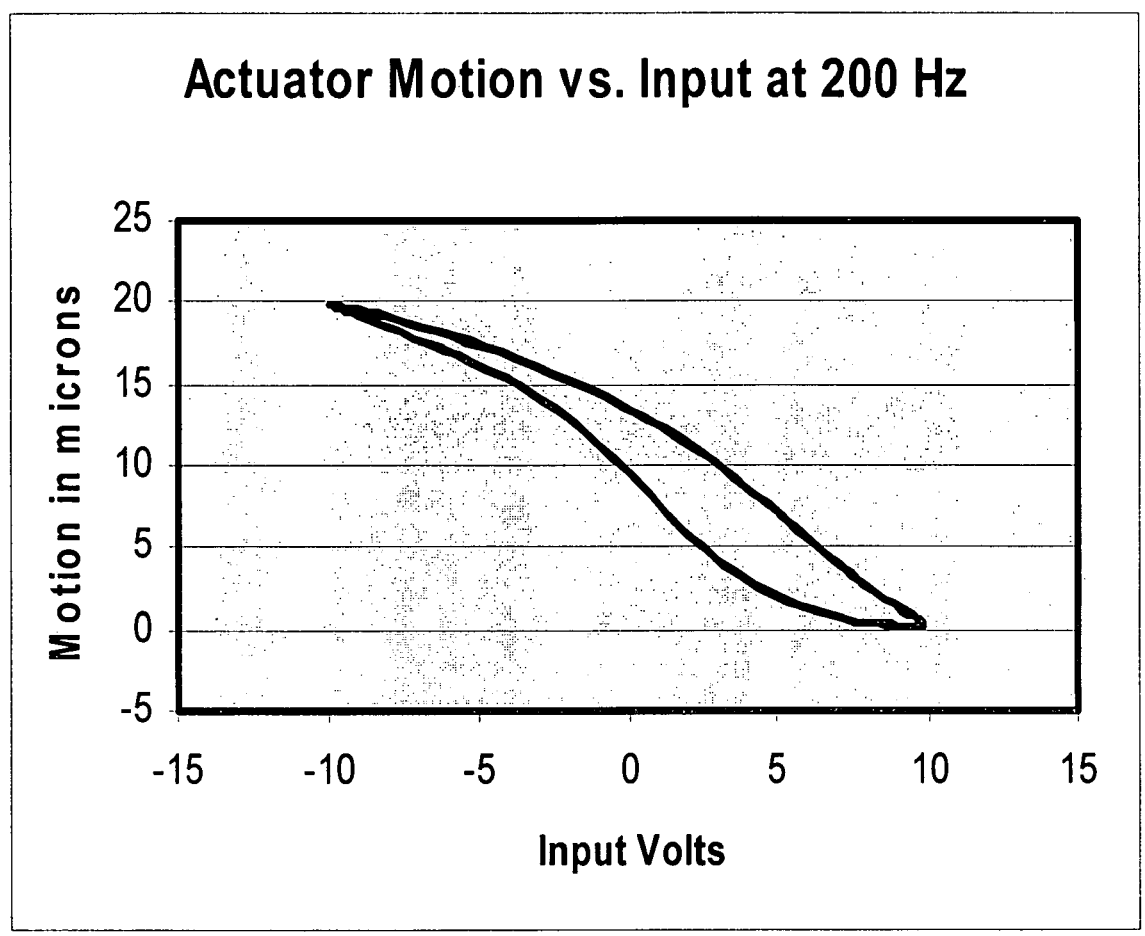

FIG. 12A is a block diagram depicting a conventional, open-loop feedback control system for an actuator, and FIG. 12B is a chart depicting actuator motion versus input voltage chart, for the FIG. 12A system. In FIG. 12A, amplifier 1201 includes feedback 1202 to control the linearity of its output. There is no feedback, however, around the combined amplifier 1201 and actuator 1203 system. Accordingly, and as seen in FIG. 12B, in this conventional embodiment the overall behavior of the system is non-linear due to the physics of actuator 1201. This non-linearity is a problem in a HDFSM system because the mirror needs to quickly and accurately follow the voltage signal from the computer.

Figure 13:
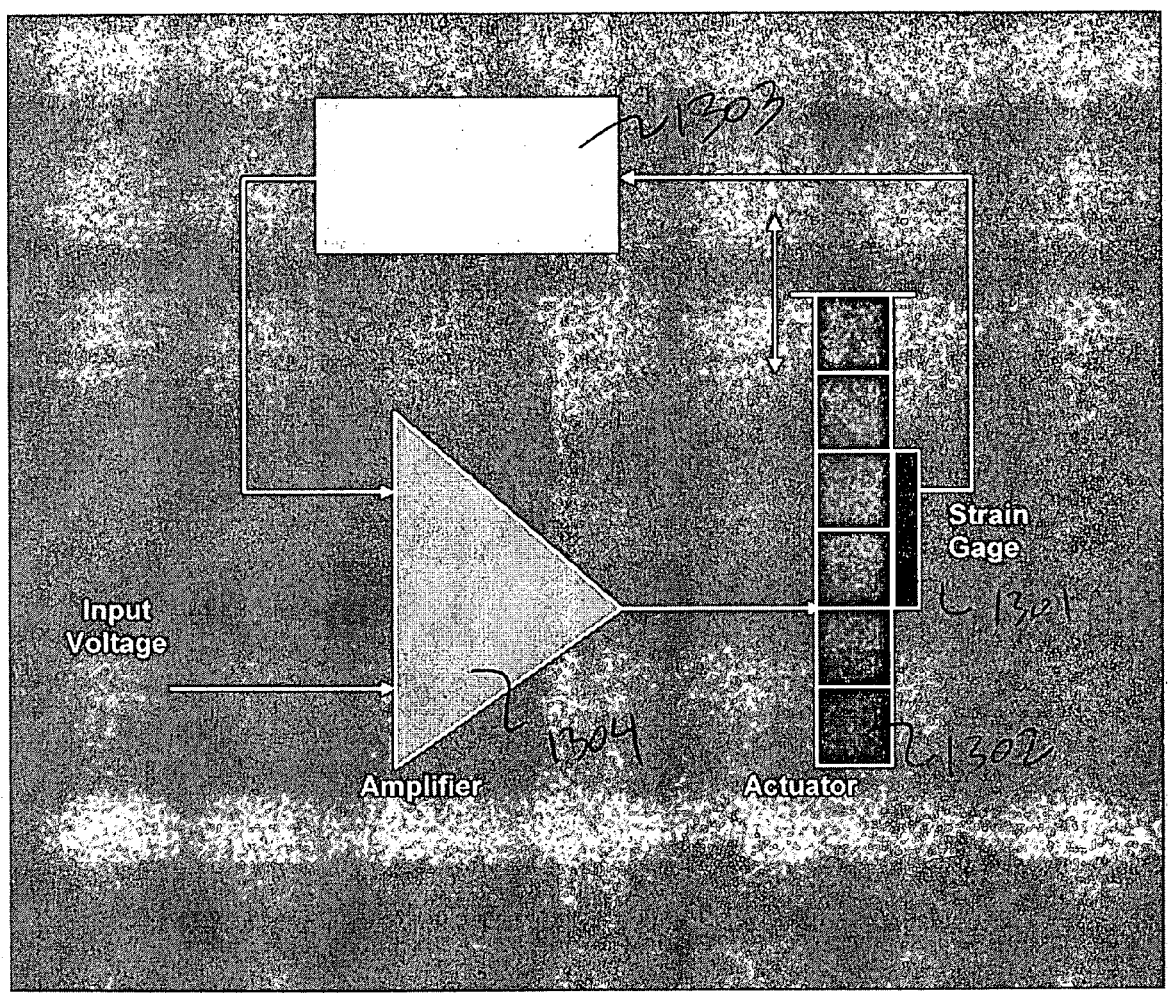
FIG. 13A is a block diagram depicting a feedback control system for an actuator according to the present invention.

FIG. 13 is a block diagram depicting a feedback control system for an actuator according to the present invention. Specifically, strain gauge 1301 has been bonded to the side of actuator 1302, to measure actual motion. A small signal from strain gauge 1301 is processed by additional electronics 1303, and fed into amplifier 1304.

Figure 14:
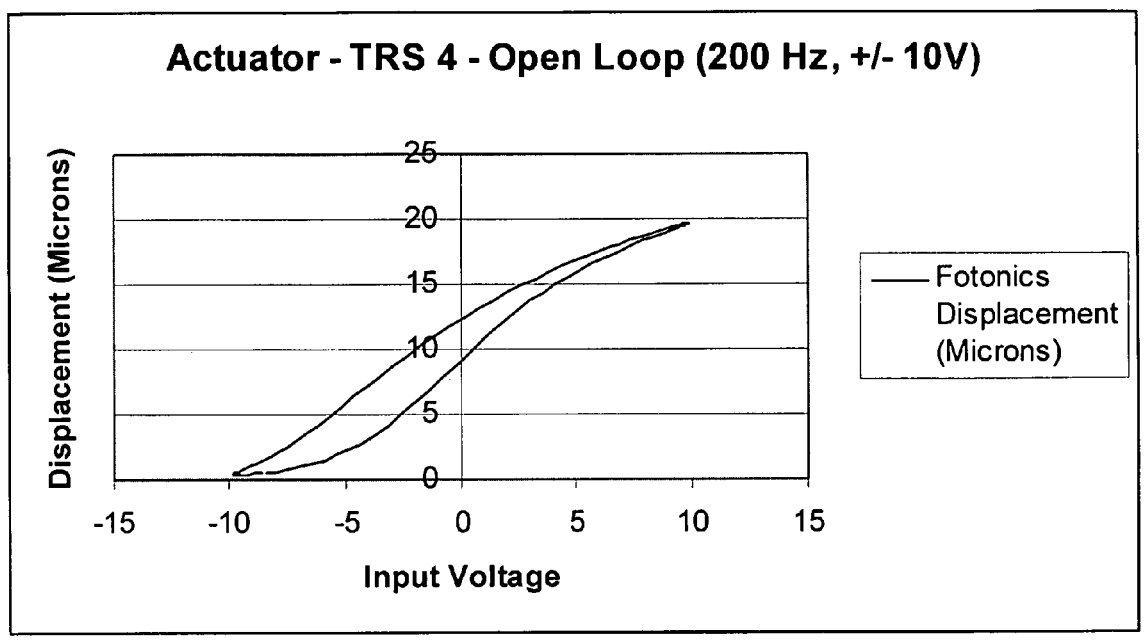
FIG. 14 is displacement versus input voltage a chart depicting experimentally-determined results for a strain test for an actuator using open-loop control, at 200 Hz and ±10V.
Figure 15:
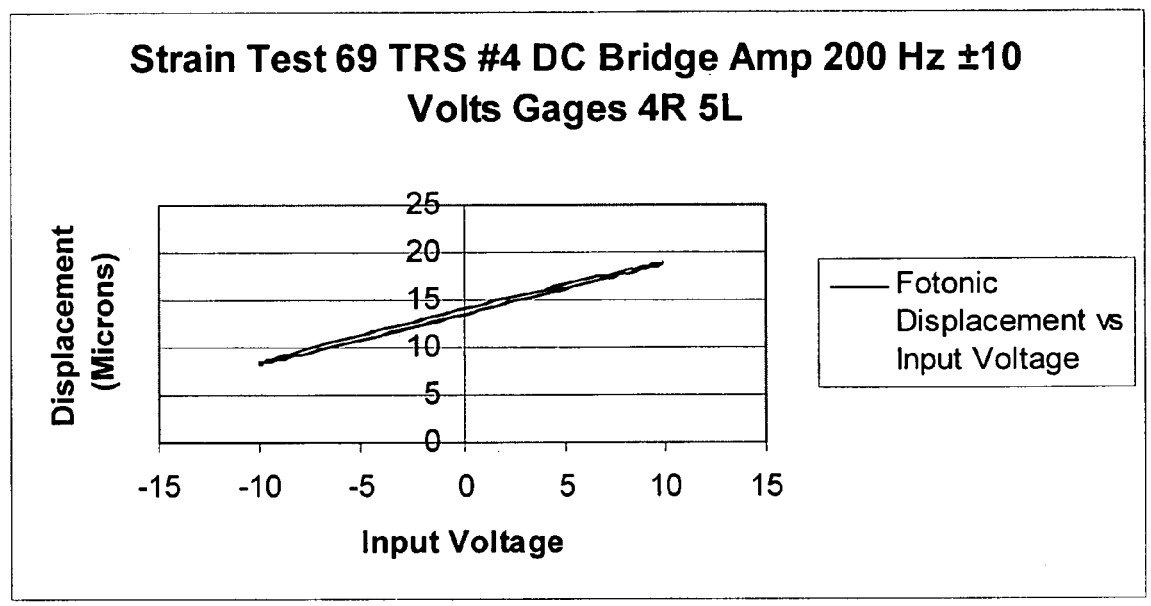
FIG. 15 charts displacement versus input voltage for a similar experiment, using closed-loop control according to the present invention.

FIG. 14 is a displacement versus input voltage chart depicting experimentally-determined results for a strain test for an actuator using open-loop control, at 200 Hz and ±10V, illustrating the non-linearity and hysteresis associated with such open-loop systems. FIG. 15 charts displacement versus input voltage for a similar experiment, using closed-loop control according to the present invention, illustrating the minimization of non-linearities, and substantial elimination of the hysteresis.

Figure 16:
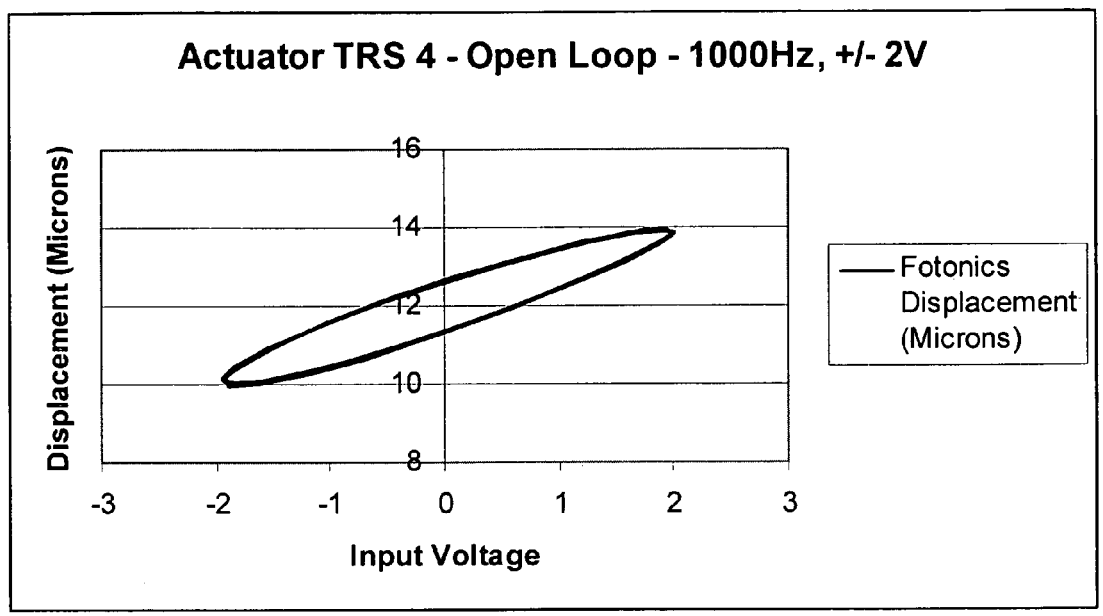
FIG. 16 is a displacement versus input voltage chart depicting experimentally-determined results for a strain test for an actuator using open-loop control, at 1 kHz, and ±2V.
Figure 17:
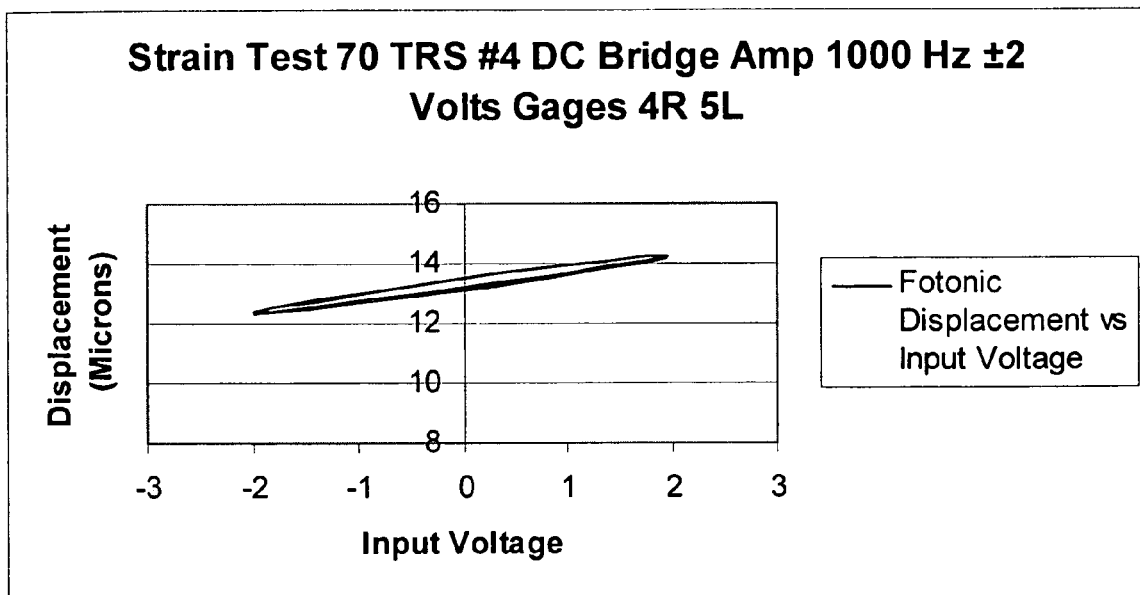
FIG. 17 charts the same inputs, for the closed-loop control system according to the present invention.

Similarly, FIG. 16 is a displacement versus input voltage chart depicting experimentally-determined results for a strain test for an actuator using open-loop control, at 1 kHz, and ±2V, illustrating the non-linearities associated with the conventional system. FIG. 17 charts the same inputs, for the closed-loop control system according to the present invention. As is seen in FIG. 17, the non-linearities are substantially eliminated, and the curve shape is near-straight.

FIG. 18 depicts the HDFSM control architecture, according to one example embodiment of the present invention. Specifically, a command input, representing intended HDFSM positioning, is input into digital input/output ("DIO") processor 1802 embedded within control system 409 via 32-bit link 1801. As is described more fully below, control system 409 controls electromechanical fast steering mirror apparatus 401 and deformable mirror apparatus 402, based upon the command input and the actuator position signals.

Based upon the commanded input, DIO processor 1802 generates electrical signal 1803, for steering electromechanical fast steering mirror apparatus 401 and deformable mirror apparatus 402. Electrical signal 1803 is summed with actuator position signal 1804 at adder 1806. The output of adder 1806 includes two components, a deformable mirror control signal 1807 and an offloader control signal 1809. Deformable mirror control signal 1807 is input into deformable mirror control 1810, which generates individual piezoactuator commands to control each of plurality of electrostrictive actuators 406 which are in physical communication with and between deformable mirror substrate 404 and backplane assembly 405. According to one aspect in which 37 actuators are used to deform deformable mirror substrate 404, deformable mirror control 1810 generates 37 piezoactuator commands, one for each actuator.

In a similar manner, offloader control signal 1809 is input into offloader control 1812, which generates individual voice-coil commands 1813 to control each of plurality of fast steering actuators, including actuator 410, which are positioned circumferentially at equal distances around backplane assembly 405. According to one aspect in which three fast steering actuators are used to position backplane assembly 405, offloader control 1812 generates three voice-coil commands, one for each fast steering actuator.

Plurality of strain gauges 407 which are each mounted on one of plurality of electrostrictive actuators 406, measure individual positions of each of plurality of electrostrictive actuators 406, and transmit the positions as actuator position signal 1804. In this regard, closed-loop control system controls electromechanical fast steering apparatus 401 and deformable mirror apparatus 402 based upon both the commanded input and actuator position signal.

By combining FSM and DM technologies and linking them with a closed-loop control system, the HDFSM system according to the present invention addresses several of the deficiencies associated with conventional adaptive optical systems. Specifically, the enhanced HDFSM system provides for high bandwidth beam stabilization of up to 10 kHz in some applications, and compensates for and corrects optical aberrations which are either induced by inherent manufacturing and assembly errors, or by atmospheric or other phenomena. Moreover, the enhanced HDFSM system provides wide angle line of sight steering, optical alignment, and beam walk control.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A high-bandwidth deformable fast steering mirror system, comprising:
   an electromechanical fast steering mirror apparatus;
   a deformable mirror apparatus mounted on said electromechanical fast steering mirror apparatus, said deformable mirror apparatus further comprising:
      a deformable mirror substrate,
      a backplane assembly,
      a plurality of electrostrictive actuators in physical communication with and between said deformable mirror substrate and said backplane assembly, for deforming said deformable mirror substrate, and
      a plurality of strain gauges, each strain gauge mounted on one of said plurality of electrostrictive actuators, said plurality of strain gauges measuring individual positions of said plurality of electrostrictive actuators and transmitting the positions as actuator position signals; and
   a closed-loop control system, said control system controlling said electromechanical fast steering mirror apparatus and said deformable mirror apparatus based upon a command input and the actuator position signals.

2. A high-bandwidth deformable fast steering mirror system according to claim 1,
   wherein said deformable mirror substrate and said backplane assembly are round, and
   wherein said electromechanical fast steering mirror apparatus further comprises:
      a plurality of fast steering actuators positioned circumferentially at equal distances around said backplane assembly, and
      a plurality of two-axis flexures in physical communication with and between said plurality of fast steering actuators and said backplane assembly.

3. A high-bandwidth deformable fast steering mirror system according to claim 2,
   wherein said electromechanical fast steering mirror apparatus further comprises a plurality of U-shaped flexures positioned circumferentially at equal distances around said backplane assembly, for supporting said deformable mirror apparatus, and
   wherein said plurality of U-shaped flexures are positioned directly across said backplane assembly from said plurality of fast steering actuators.

4. A high-bandwidth deformable fast steering mirror system according to claim 2, wherein said plurality of fast steering actuators comprise voice coil actuators.

5. A high-bandwidth deformable fast steering mirror system according to claim 1,
   wherein said electromechanical fast steering mirror apparatus has a bandwidth control of up to 200 Hz over an angle of ±25 mrad, and wherein said deformable mirror apparatus has a bandwidth of up to 10 kHz.

6. A reaction canceling high-bandwidth deformable fast steering mirror system, comprising:

a first electromechanical fast steering mirror apparatus;

a deformable mirror apparatus mounted on said first electromechanical fast steering mirror apparatus, said deformable mirror apparatus further comprising:

a deformable mirror substrate, a backplane assembly, a plurality of electrostrictive actuators in physical communication with and between said deformable mirror substrate and said backplane assembly, for deforming said deformable mirror substrate, and a plurality of strain gauges, each strain gauge mounted on one of said plurality of electrostrictive actuators, said plurality of strain gauges measuring individual positions of said plurality of electrostrictive actuators and transmitting the positions as actuator position signals;

a second electromechanical fast steering mirror apparatus mounted obverse to said first electromechanical fast steering mirror apparatus;

a counterweight mounted on said second electromechanical fast steering mirror apparatus, said counterweight synchronously moving in an equal and opposite motion to said deformable mirror apparatus, for canceling motion of said deformable mirror apparatus; and a closed-loop control system, said control system controlling said first electromechanical fast steering mirror apparatus, said second electromechanical fast steering mirror apparatus, and said deformable mirror apparatus based upon a command input and the actuator position signals.

7. A reaction canceling high-bandwidth deformable fast steering mirror system according to claim 6, wherein said deformable mirror substrate and said backplane assembly are round, and wherein said electromechanical fast steering mirror apparatus further comprises:

a plurality of fast steering actuators positioned circumferentially at equal distances around said backplane assembly, and a plurality of two-axis flexures in physical communication with and between said plurality of fast steering actuators and said backplane assembly.

8. A reaction canceling high-bandwidth deformable fast steering mirror system according to claim 7, wherein said first electromechanical fast steering mirror apparatus further comprises a plurality of U-shaped flexures positioned circumferentially at equal distances around said backplane assembly, for supporting said deformable mirror apparatus, and wherein said plurality of U-shaped flexures are positioned directly across said backplane assembly from said plurality of fast steering actuators.

9. A reaction canceling high-bandwidth deformable fast steering mirror system according to claim 7, wherein said plurality of fast steering actuators comprise voice coil actuators.

10. A reaction canceling high-bandwidth deformable fast steering mirror system according to claim 6, wherein said first electromechanical fast steering mirror apparatus has a bandwidth control of up to 200 Hz over an angle of ±25 mrad, and wherein said deformable mirror apparatus has a bandwidth of up to 10 kHz.

* * * * *

UNITED STATES PATENT AND TRADEMARK OFFICE
CERTIFICATE OF CORRECTION

PATENT NO. : 7,380,950 B1
APPLICATION NO. : 11/057199
DATED : June 3, 2008
INVENTOR(S) : Lorell et al.

It is certified that error appears in the above-identified patent and that said Letters Patent is hereby corrected as shown below:

ON THE TITLE PAGE

Item (75) Inventors, the third named inventor "Craig L. Horn" should read --Craig L. Hom--.

IN THE SPECIFICATION

In column 7, line 16, "±25 grad" should read --± 25 μrad--.

In column 7, line 21, "±25 Grad" should read --± 25 μrad--.

Signed and Sealed this

Twenty-fifth Day of November, 2008

JON W. DUDAS
*Director of the United States Patent and Trademark Office*